Patented Mar. 27, 1945

2,372,313

UNITED STATES PATENT OFFICE 2,372,313

DIARYLAMINO-TRIANTHRIMIDES

Edwin C. Buxbaum, Media, Pa., assignor to E. I. du Pont de Nemours & Company, Wilmington, Del., a corporation of Delaware No Drawing. Original application September 24, 1940, Serial No. 358,099. Divided and this application June 25, 1943, Serial No. 492,305

4 Claims. (Cl. 260—367)

This invention relates to the preparation of new dyestuffs of the anthraquinone series and more particularly to the preparation of new dyestuffs which dye wool and related fibers directly in gray shades. The present application, which is a division of U. S. Serial No. 358,099 filed September 24, 1940, U. S. P. 2,335,643 is directed more particularly to the new intermediates employed in the preparation of these new dyestuffs, which intermediates are useful not only in the preparation of the acid wool dyes, but may be employed as pigments or as intermediates in the preparation of other color compounds.

With few exceptions, the acid wool dyestuffs of the anthraquinone series which are at present employed in the dyeing of wool and related fibers are simple anthraquinone compounds, i. e., compounds where only a single anthraquinone nucleus appears in the molecule. Several dianthraquinonylamino compounds have been suggested for use on wool, but with few exceptions such dyes heretofore proposed from this class show poor tinctorial strength, light fastness properties or undesirable changes on chroming. Because of the poor dyeing properties generally exhibited by the compounds of the dianthrimide series heretofore considered for dyeing wool, it has been assumed that the higher molecular weight trianthrimides would be of no value for this purpose, this assumption being supported by the fact that the straight trianthrimide such as that disclosed in U. S. Patent 863,397 when sulfonated is of no practical value as a wool dyestuff.

In the anthraquinone acid wool dyestuff field it has been difficult to find dyes which dye in desirable gray shades except those which are produced by the chroming of dyes which dye directly in other shades. While there are of course a few dyes of the anthraquinone series which dye wool and related fibers directly from an acid or neutral bath in gray shades as stated above, in general these dyes are not of desirable shade, or they are defective in light-fastness, tinctorial properties or show undesirable changes on chroming where such treatment is required for other purposes. A great deal of research has therefore been expended in an endeavor to find new dyestuffs of the anthraquinone series which will dye wool in desirable gray shades of good fastness properties.

It is therefore an object of the invention to produce new diarylamino-trianthrimides from which new dyes of the anthraquinone series can be produced which dye wool and related fibers directly in gray shades and which exhibit good dyeing and fastness properties, and which show relatively little change in shade on chroming.

I have found that contrary to the general belief, very desirable dyestuffs for wool and related fibers can be produced in the trianthrimide (dianthraquinonylamino - anthraquinone) series from trianthrimides which carry one or more arylamino groups of the benzene or naphthalene series directly attached thereto by converting them to water soluble sulfonic acids. In the dyes of this series the sulfonation takes place readily with sulfuric acid of as low as 93% strength and at temperatures as low as 20° C., although oleum of as high as 65% may be employed when desired. This ease of sulfonation is apparently due to the presence in the molecule of the aryl amine groups of the benzene or naphthalene series into each of which a sulfonic acid group is readily introduced. In the prior art where sulfonated anthrimide compounds are suggested, the sulfonic acid groups must be introduced into the anthraquinone nucleus which requires more strenuous conditions of sulfonation. These new compounds may be prepared by condensing two moles of an amino-arylamino-anthraquinone with one mole of a dihalogenanthraquinone, the condensation being effected by any of the known processes employed for the preparation of the trianthrimide compounds. The invention also contemplates the condensation of two moles of a halogen compound with a diamino diarylamino anthraquinone such as 1,5-diamino-4,8-dianilino anthraquinone.

All of these compounds dye directly in gray shades ranging from greenish-gray to reddish-gray and on chroming show only a very small change in shade.

That these new diarylamino trianthrimide sulfonic acids, even when they contain no further substituents, should dye in good strength and show good affinity for wool and related fibers is surprising when it is known that the 4,4'-diphenylaminodianthrimide on sulfonation has very poor affinity and dyeing strength, for it is generally concluded that the higher molecular weight compounds of the anthraquinone series when sulfonated would have poor affinity for wool and related fibers.

The arylamino groups which may be present in the molecule may be any of those of the benzene series or naphthalene series such as anilino, toluidino, xylidino, alpha or beta-naphthylamino. The arylamino groups and the anthraquinone groups of the trianthrimide may also contain further simple monovalent substituents such as methyl, amino, nitro, hydroxy and halogen.

These new gray dyestuffs show good light fastness and tinctorial power, and relatively little change in shade on chroming.

The following examples are given to illustrate the invention. The parts used are by weight.

*Example 1*

Thirty-one and four-tenths (31.4) parts of 1-amino-4-anilino-anthraquinone are reacted with 13.9 parts of 2,6-dichloro-anthraquinone in 500 parts of naphthalene, 50 parts of potassium acetate and one part of copper acetate at 210°–215° C. for eight hours. The acetic acid which is formed during the course of the reaction is allowed to distill off. When the reaction has been completed, the mass is allowed to cool to 140° C. and diluted with 1,000 parts of solvent naphtha and held at 100° C. for 2 hours. It is then filtered, and the cake is washed with additional solvent naphtha and finally with ethyl alcohol and hot water. The base is dried at 100°–110° C. It corresponds to the following formula:

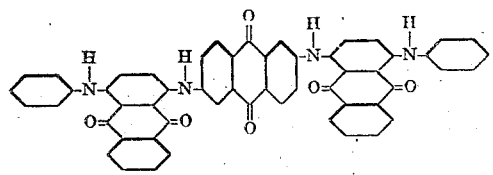

Ten (10) parts of the above compound are added to a mixture of 50 parts of sulfuric acid monohydrate and 50 parts of 25% oleum over a period of one hour. When all of the base has been added, the temperature is raised to 60°–70° C., and held there until sulfonation is complete, which usually takes about thirty minutes. The sulfonated base is then isolated by pouring out into 800 parts of ice and water, filtering, washing acid free with brine and finally drying at 100°–110° C. It dyes wool in greenish-gray shades which change very little upon chroming and exhibit good light fulling fastness.

*Example 2*

Thirty-four and three-tenths (34.3) parts of 1-amino-2-methyl- 4 -p-toluidino-anthraquinone are reacted with 14 parts of 2,6-dichloro-anthraquinone in 500 parts of naphthalene in the presence of 50 parts of potassium acetate and 1 part of copper acetate at 210°–215° C. for a period of 8 hours. When the reaction has been completed, the mass is allowed to cool to 100° C. and diluted with 1000 parts of solvent naphtha. The diluted reaction mass is held two hours additional at 100° C. and then allowed to cool slowly to 50° C., and filtered at this temperature. The filter cake is washed with additional solvent naphtha and finally with hot water and dried. The compound formed corresponds to the following formula:

Ten (10) parts of the above base are dissolved in a mixture of 50 parts of sulfuric acid mono-hydrate and 50 parts of 25% oleum. The sulfonation mass is heated to 60° C. for one hour and then poured out into 800 parts of ice and water. It is filtered off, washed acid free with brine and dried. The compound formed dissolves in water with a dark blue color and dyes wool from an acid bath in neutral gray shades which change very little on chroming. It exhibits good affinity for the fiber and has desirable fastness properties.

*Example 3*

Sixteen (16) parts of 1-amino-4-anilino-anthraquinone are condensed with 7 parts of 1,5-dichloro-anthraquinone in 250 parts of naphthalene in the presence of 25 parts of potassium acetate and 0.5 part of copper acetate at 210°–215° C. for a period of six hours. When the condensation is complete, the mass is cooled to 140° C. and diluted with 500 parts of solvent naphtha. It is then cooled to 50° C. and filtered at this temperature. The filter cake is washed with sufficient solvent naphtha to insure the removal of all naphthalene and then with alcohol, hot water, and dried.

The compound formed is slightly soluble in most organic solvents with a blue shade. It corresponds to the following formula:

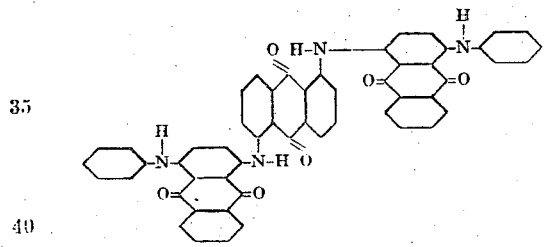

The above compound is easily sulfonated at room temperature by dissolving it in 10% oleum and allowing it to stir for 8 hours. The isolation of the sulfonated color proceeds in the usual manner. The dyestuff formed dyes wool in greenish-gray shades which change very little on chroming and exhibits excellent fastness to light.

*Example 4*

Thirty-four and three-tenths (34.3) parts of 1 - amino - 2 - methyl - 4 - p - toluidino-anthraquinone are reacted with 14 parts of 1,5-dichloro-anthraquinone in 500 parts of naphthalene in the presence of 50 parts of potassium acetate and 1.0 part of copper acetate at a reflux temperature for 10 hours. The finished condensation is diluted with 1000 cc. solvent naphtha and held at 100° C. for 2 hours. It is then slowly cooled to room temperature and filtered, freed of naphthalene by washing with additional solvent naphtha and finally washed with alcohol

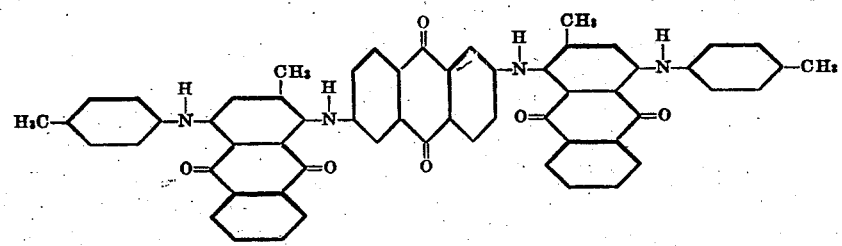

and hot water. The base formed corresponds to the following formula:

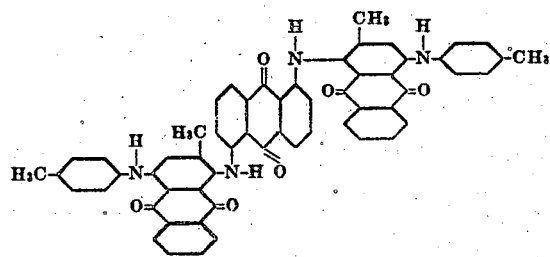

Ten (10) parts of the above base are dissolved in 100 parts of 12.5% oleum and heated to 40° C. until complete sulfonation has occurred. It is then isolated in the usual manner. The dyestuff dyes wool from an acid bath in taupe shades which become considerably browner on chroming. It exhibits good fastness to light, washing and fulling.

*Example 5*

Thirty-one and four-tenths (31.4) parts of 1-amino-4-anilino-anthraquinone are reacted with 14 parts of 1,6-dichloro-anthraquinone in 500 parts of naphthalene in the presence of 50 parts of potassium acetate and 1 part of copper acetate at 210°–215° C. for a period of 8 hours. The acetic acid which is formed during the condensation is allowed to distill off. The reaction mass is allowed to cool to 140° C. and is then diluted with 1000 parts of solvent naphtha and held at 140° C. for one hour. It is then cooled to 100° C., held there for two hours and then cooled slowly to room temperature. The diluted condensation is filtered, the anthrimide washed with solvent naphtha, alcohol, and finally with water. It corresponds to the following formula:

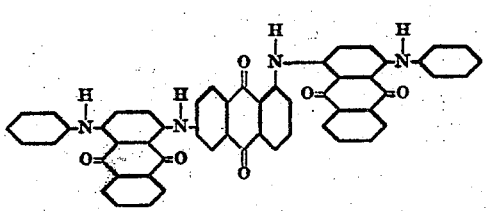

The above compound sulfonates easily in strong sulfuric acid to give a water soluble dyestuff which dyes wool from an acid bath in blue-gray shades which change slightly on chroming. It exhibits good fastness properties.

If in the above example there is employed 1-amino-5-anilino-anthraquinone in place of 1-amino-4-anilino-anthraquinone, a much redder shade of gray is produced.

*Example 6*

Forty-one (41) parts of 1-amino-2-bromo-4-para-toluidino-anthraquinone are reacted with 14 parts of 1,6-dichloro-anthraquinone in 500 parts of naphthalene in the presence of 50 parts of potassium acetate and one part of copper acetate at 210°–215° C. for a period of eight hours. The condensation mass is diluted with sufficient solvent naphtha to hold the naphthalene in solution and is then cooled to room temperature and filtered. It is washed with additional solvent naphtha, alcohol and hot water. The black powder which is obtained corresponds to the following formula:

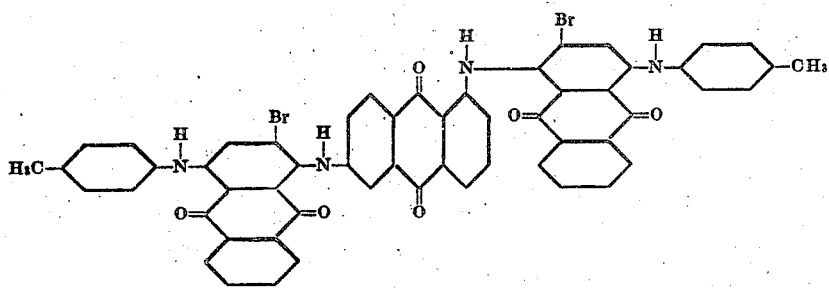

One hundred (100) parts of the above compound are dissolved in 1000 parts of 12.5% oleum and heated until complete sulfonation is obtained. The acid mass is poured into sufficient ice and water to bring the acid concentration down to 10%. The free disulfonic acid is precipitated out and is filtered off, washed acid free with brine and dried at 100°–110° C. It dyes wool from an acid bath in fast gray shades.

*Example 7*

Twenty-four and three-tenths (24.3) part of 1-chloro-anthraquinone are reacted with 21 parts of 1,5-diamino-4,8-dianilino-anthraquinone in 500 parts of naphthalene in the presence of 50 parts of potassium acetate and one part of copper acetate for eight hours at 210°–215° C. When the reaction has been completed, the mass is cooled to 140° C. and diluted with 1000 parts of solvent naphtha. The diluted condensation is then cooled, filtered, washed with alcohol, hot water and dried at 100°–110° C. It corresponds to the following formula:

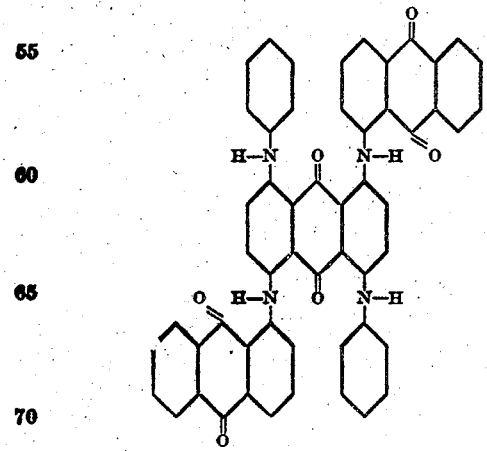

When the above compound is sulfonated in the usual manner, there is obtained a new gray wool dyestuff which has good fastness properties.

Example 8

If, in the above example, there is substituted 1-amino-4-chloro-anthraquinone in place of 1-chloro-anthraquinone, the following compound is obtained:

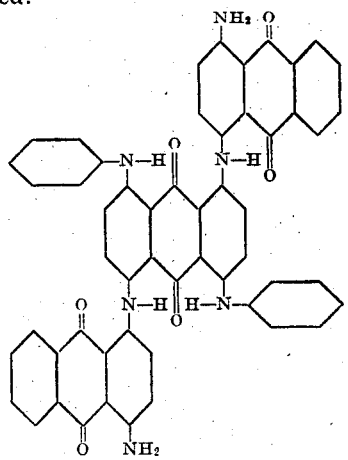

Upon sulfonation in the usual manner, this gives a new blue gray dyestuff which dyes wool from an acid bath in blue-gray shades which are fast to light and other usual fastness tests.

Example 9

Thirty-one and four-tenths (31.4) parts of 1-amino-4-anilino-anthraquinone are reacted with 13.9 parts of 1,4-dichloro-anthraquinone in 450 parts of naphthalene in the presence of 45 parts of potassium acetate and one part of copper acetate at 210°–215° C. for 8 hours. When the condensation is complete, the mass is diluted with solvent naphtha as in the previous examples and filtered. The precipitated trianthrimide is washed with additional solvent naphtha, alcohol and finally with hot water. It corresponds to the following formula:

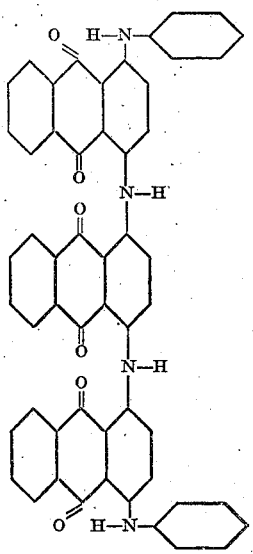

When sulfonated in 10% oleum at 60°–65° C. in the usual manner, there is obtained a new wool gray dyestuff which dyes wool from an acid bath in gray shades of good fastness properties.

The condensation of the amino-arylamino-anthraquinone compounds with the dihalogen anthraquinones may be effected in any one of the numerous media, such as hexalin, ortho-dichloro-benzene, nitro-benzene or other solvents in place of naphthalene used in the examples. If naphthalene is used, any one of numerous solvents can be employed for dilution in place of solvent naphtha, for instance, toluene, benzene or dioxan. Temperatures ranging from 125°–225° C. may be used depending on the solvent and length of time condensed.

The sulfonation can be carried out at temperatures ranging from 20° C. to 140° C. Sulfuric acid from 93% strength to 65% oleum can be used. The weaker acids require the higher temperatures, while the stronger oleums effect sulfonation at lower temperatures.

The advantage of these trianthrimide dyestuffs is that they are fast to light, direct gray dyes which show very little difference either when dyed direct from an acid bath or chromed. In addition, they show good tinctorial power.

The anthrimide compounds of the types above described are useful not only in the preparation of the sulfonic acid derivatives, but may be employed as pigments and as intermediates in the preparation of other colors.

I claim:

1. Diarylamino-trianthrimides in which each of the amino groups of the trianthrimide nucleus is connected in an alpha position on at least one anthraquinone molecule, and which trianthrimides carry the arylamino groups in para position on the anthraquinone nucleus relative to the imino linkages and in which the aryl groups are monocyclic groups of the benzene series.

2. 4',4''-dianilino-1,5-(1',1'' - di - anthraquinonylamino) anthraquinone.

3. 4',4''-dianilino-2,6-(1',1'' - di - anthraquinonylamino) anthraquinone.

4. 4',4''-dianilino-1,4-(1',1'' - anthraquinonlyamino) anthraquinone.

EDWIN C. BUXBAUM.